United States Patent

Lopez Alba

(10) Patent No.: US 6,857,529 B2
(45) Date of Patent: *Feb. 22, 2005

(54) PANTOGRAPHIC DEVICE FOR CONVEYING LOADS IN VEHICLE ASSEMBLY LINES

(75) Inventor: Adelardo Lopez Alba, Papiol (ES)

(73) Assignee: Transportes Continuos Interiores, S.A., Papiol (ES)

(*) Notice: Subject to any disclaimer, the term of this patent is extended or adjusted under 35 U.S.C. 154(b) by 104 days.

This patent is subject to a terminal disclaimer.

(21) Appl. No.: 10/305,917

(22) Filed: Nov. 27, 2002

(65) Prior Publication Data

US 2004/0101393 A1 May 27, 2004

(51) Int. Cl.[7] .............................................. B66C 13/06
(52) U.S. Cl. ....................... 212/273; 212/319; 212/334; 414/626
(58) Field of Search ................................ 414/680, 681, 414/626; 212/273, 319, 333, 334

(56) References Cited

U.S. PATENT DOCUMENTS

| | | | | |
|---|---|---|---|---|
| 2,933,198 A | * | 4/1960 | Firestone et al. ........... | 212/319 |
| 2,953,969 A | * | 9/1960 | Pepple ........................ | 414/626 |
| 4,110,596 A | * | 8/1978 | Okamoto et al. ......... | 219/124.4 |
| 5,263,687 A | * | 11/1993 | Garbiso ...................... | 254/334 |
| 5,531,830 A | * | 7/1996 | Ichinose et al. ............. | 118/423 |
| 5,538,382 A | * | 7/1996 | Hasegawa et al. ....... | 414/141.7 |
| 6,712,230 B2 | * | 3/2004 | Lopez Alba ................ | 212/273 |

FOREIGN PATENT DOCUMENTS

JP 405085694 A * 4/1993 ................. 212/273

* cited by examiner

Primary Examiner—Dean J. Kramer
Assistant Examiner—Michael Lowe
(74) Attorney, Agent, or Firm—Michael J. Striker

(57) ABSTRACT

A pantographic device for conveying loads in vehicle assembly lines includes a horizontal assembled drive shaft on an upper frame and with the capacity to rotate, several parallel pulleys fixed to a drive shaft, two motors acting on the opposing ends of the drive shaft providing its rotational movement, and several flat belts fixed to the pulleys of the drive shaft on one end and two a lower frame on the opposite end, so that the rotation of the drive shaft in one direction and the other determines vertical lifting and lowering of the lower frame with regard to the upper frame.

1 Claim, 2 Drawing Sheets

PANTOGRAPHIC DEVICE FOR CONVEYING LOADS IN VEHICLE ASSEMBLY LINES

BACKGROUND OF THE INVENTION

The present invention refers to a pantographic device for conveying loads in vehicle assembly lines and more specifically for conveying the vehicles or parts thereof along an assembly chain.

In vehicle assembly chains, it is currently necessary to convey loads through different work areas or posts where the assembly thereof is to be performed. Said loads can be formed by any of the vehicle components to be assembled, such as the chassis, engines, doors, etc.

To aid in the assembly tasks, it is helpful that the different vehicle components pass through the work stations or posts in a more or less elevated position, depending on the assembly tasks to be performed in each one of said work stations or posts.

Different devices for conveying loads in vehicle assembly lines are currently known, said devices generally having an elevated guide rail upon which a carriage is assembled which moves longitudinally along the guide rail in order to longitudinally shift the load in question or through the assembly line.

These devices also have a series of elements suspended from the shiftable carriage and which permit vertically shifting the load, distancing it from the ground in a greater or lesser degree.

In patent U.S. Ser. No. 09/986,097 from the same applicant, these elements intended to change the height of the load with regard to the ground include an upper frame assembled on the shiftable carriage, a lower frame provided with arms for holding the load and a lifting mechanism which enables changing the distance between the upper frame and the lower frame.

In said patent U.S. Ser. No. 09/986,097 from the same applicant, the upper frame and the lower frame are joined by articulated arms whose ends are respectively fixed to said upper frame and to said lower frame by means of horizontal rotation shafts.

In order to vertically shift the lower frame with regard to the upper frame, a rotating drum is assembled on said upper frame, which is actuated by a single motor member and which acts on cables fixed to the lower frame, such that when the cables wind and unwind in said rotating drum, the lower frame is lifted and lowered, respectively.

The use of a rotating drum actuated by a single motor element for causing the cables to wind and unwind, and the subsequent lifting and lowering of the lower frame, poses several drawbacks, among which it is worth mentioning the high maintenance costs of the rotating drum in order to ensure proper functioning thereof, periodic maintenance and revision of the cables, which increases the facility maintenance costs, and the risk of the lower frame lowering uncontrollably in the case that the motor element responsible for actuating the drum should experience a breakdown.

SUMMARY OF THE INVENTION

The pantographic device for conveying loads on assembly lines, object of this invention, is of the type including: an elevated guide rail where a carriage is assembled with the possibility of longitudinal shifting, an upper frame suspended from said carriage, a lower frame provided with arms for holding the load to be conveyed, articulated arms that join the upper frame and the lower frame, permitting a change of height of the lower frame with regard to the upper frame, and a lifting mechanism acting on the lower frame, causing the lifting and lowering thereof. The pantographic arrangement of said articulated arms prevents any horizontal shifting of the lower frame, solely permitting it to shift in a vertical direction.

The device of this invention has several constructive particularities in terms of the lifting mechanism which permit significantly reducing maintenance tasks and prevent the lower frame from being able to lower uncontrollably while using the device object of the invention.

According to the invention, the lifting mechanism responsible for causing the lifting and lowering of the lower frame comprises a drive shaft horizontally assembled on the upper frame with a rotating capacity, several parallel pulleys fixed to said drive shaft, two motors acting on the opposing ends of the drive shaft, providing a rotational movement, and several flat belts that are fixed on one of their ends to the respective pulleys of the drive shaft and fixed to the lower frame on the opposite end, the rotation of the drive shaft in one direction and the other determining the lifting and lowering of the lower frame, respectively.

The use of a drive shaft with said pulleys for lifting and lowering the lower frame by means of its actuation on the flat belts implies a significant advantage with regard to the previously used lifting mechanisms, since neither the drive shaft nor the pulleys require specific maintenance for the proper functioning thereof.

Another one of the implied advantages in using this lifting mechanism is determined by using two motors acting on the opposing ends of the drive shaft, since in the case of one of said motors breaking down, the fall and uncontrollable lowering of the lower frame is prevented by means of using the operating motor as a brake element.

Furthermore, the use of two motors for actuating the drive shaft prevents the pantographic device for conveying loads in vehicle assembly lines from being idle in the case that a failure or breakdown were to occur in any one of said motors.

Another advantage of the present lifting mechanism is determined by using flat belts instead of cables for lifting and lowering the lower frame, since using these flat belts in conjunction with the previously mentioned pulleys ensures that the flat belts are always wound in the plane defined by the trajectory of the belts and without there being a lateral shifting, as occurs with cables.

Therefore, the use of flat belts rather than cables ensures that the action thereof on the lower frame is carried out in a completely vertical direction without there being any horizontal component forces that tend to laterally shift the lower frame with regard to the upper frame.

BRIEF DESCRIPTION OF THE DRAWINGS

In order to complement the description that is being given and with the object of helping to understand the features of the invention, a set of drawings are attached to the present specification which, with an illustrative and non-limiting character, show the following.

DESCRIPTION OF THE PREFERRED EMBODIMENT

Figure 1:
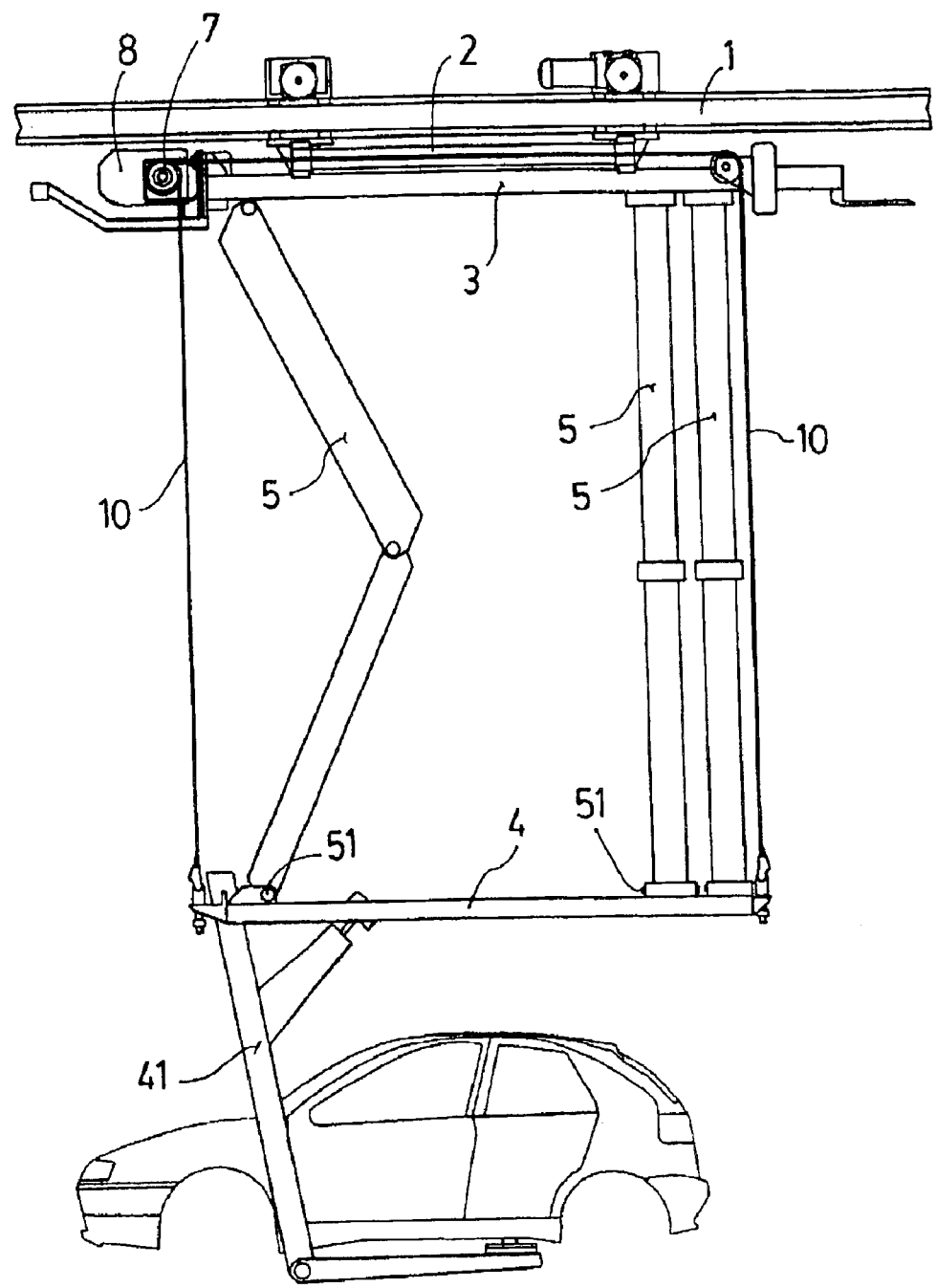
FIG. 1 shows an elevational view of the pantographic device for conveying loads in vehicle assembly lines.
Figure 2:
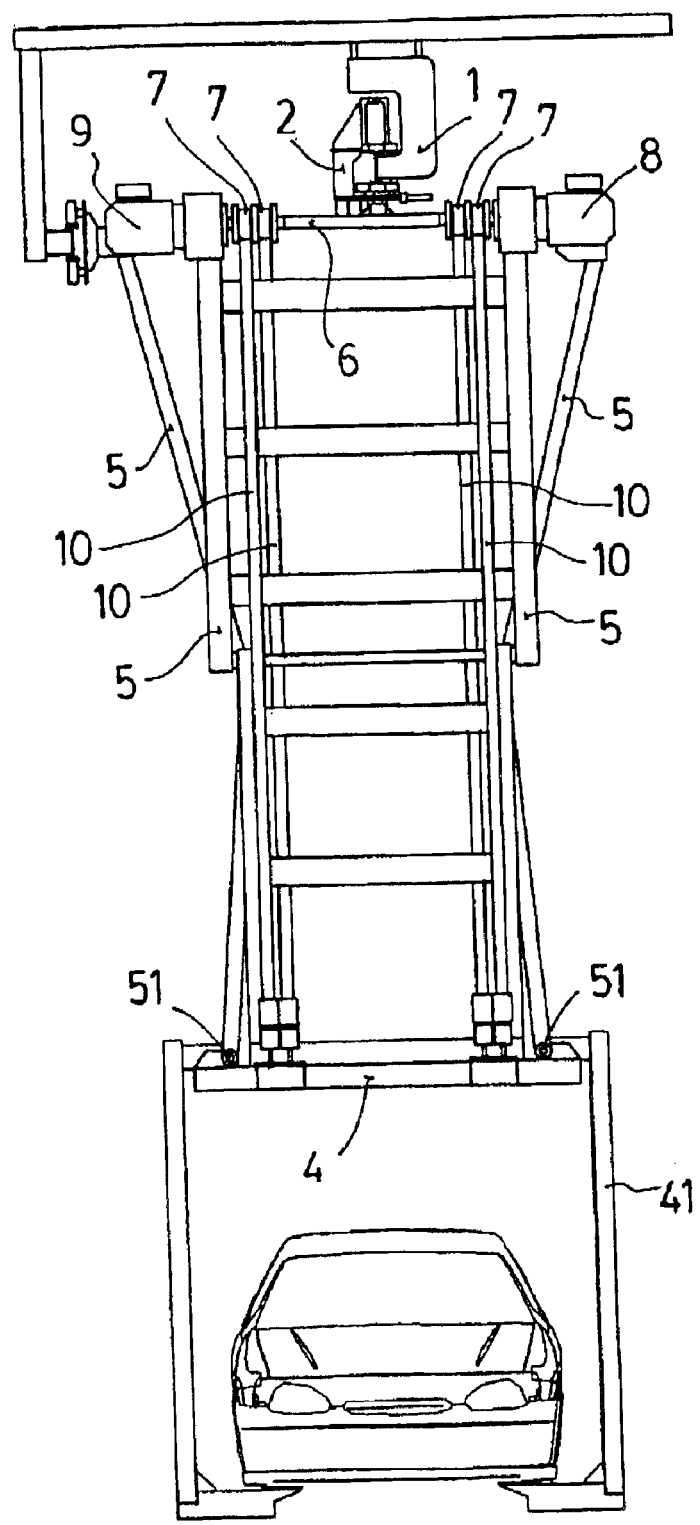
FIG. 2 shows a profile view of the pantographic device shown in the previous figure.

As can be seen in said figures, the pantographic device for conveying loads in assembly lines has: an elevated guide rail (1), a shiftable carriage (2) assembled on the elevated guide rail (1), an upper frame (3) suspended from the carriage (2), a lower frame (4) provided with an arm (41) for holding the load to be conveyed and several articulated arms (5) fixed to the upper frame (3) and to the lower frame (4) by means of horizontal rotation shafts (51) said arms (5) enabling the lifting and lowering of the lower frame (4) with regard to the upper frame (3). The pantographic arrangement of said arms (5) prevents any horizontal shifting of the lower frame (4), solely permitting said lower frame (4) to shift in a vertical direction.

In order to obtain vertically shifting the lower frame (4), this pantographic device includes a lifting mechanism comprising a horizontally assembled drive shaft (6) and with rotating capacity with regard to the upper frame (3), several parallel pulleys (7) fixed on the drive shaft (6), two motors (8 and 9) acting on the opposing ends of the drive shaft (6), and several flat belts (10) fixed to the respective pulleys (7) by one of their ends and to the lower frame (4) by the opposite end.

Using two motors (8 and 9) for actuating the drive shaft (6) permits preventing the lower frame (4) from being able to lower uncontrollably in the case that a breakdown or failure of any one of the two motors (8 or 9) should occur, since in this case, the operating motor will act as a brake, preventing the lower arm (4) from suddenly lowering.

Furthermore, the use of two motors (8 and 9) for actuating the drive shaft permits keeping the pantographic device operative for a certain time and without it being necessary to stop the assembly line when a failure or breakdown occurs in one of the two motors (8, 9) responsible for actuating the drive shaft (6).

For another part, using the drive shaft (6) in conjunction with the pulleys (7) to actuate the flat belts (10) responsible for causing the lifting and lowering of the lower frame (4) significantly reduces the maintenance tasks to be carried out with regard to the conventional drum and cable systems.

Using flat belts (10) instead of cables, in addition to allowing for a reduction of maintenance tasks and costs, provides other advantages such as ensuring a perfect vertical shift of the lower frame (4) since said flat belts are wound around themselves inside of the pulleys (7) without the possibility of a lateral shift thereof existing.

Having sufficiently described the nature of the invention as well as a preferred embodiment example, it is hereby stated for due purposes that the materials, shape, size and arrangement of the described elements can be modified, as long as this implies no alteration of the essential features of the invention, which are claimed below.

What is claimed is:

1. Pantographic device for conveying loads in vehicle assembly lines; of the type having an elevated guide rail (1), a shiftable carriage (2) assembled on the elevated guide rail (1), an upper frame (3) suspended from the shiftable carriage (2), a vertically shiftable lower frame (4), articulated arms (5) joining the upper frame (3) and the lower frame (4), an arm (41) on the lower frame (4) for holding the vehicle load and lifting mechanism for changing the height of the lower frame with regard to the upper frame; characterized in that the lifting mechanism comprises: a horizontally assembled drive shaft (6) on the upper frame (3) and with the capacity to rotate, several parallel pulleys (7) fixed to the drive shaft (6), two motors (8, 9) acting on the opposing ends of the drive shaft (6) providing it rotational movement and several flat belts (10) fixed to the respective pulleys (7) of the drive shaft (6) on one end and to the lower frame (4) on the opposite end, the rotation of the drive shaft (6) in one direction and the other determining the vertical lifting and lowering of the lower frame (4) respectively with regard to the upper frame (5).

* * * * *